United States Patent [19]

Conrad et al.

[11] Patent Number: 5,676,173
[45] Date of Patent: Oct. 14, 1997

[54] IN-LINE VENTURI

[75] Inventors: Wayne Ernest Conrad, Hampton; Helmut Gerhard Conrad, Oshawa; Richard Stanley Phillips; Andrew Richard Henry Phillips, both of Courtice; Gerald Earl Bowman, Newcastle; Michael John Preston, West Hill, all of Canada

[73] Assignee: T I Properties, Inc., Los Angeles, Calif.

[21] Appl. No.: 455,287

[22] Filed: May 31, 1995

Related U.S. Application Data

[63] Continuation-in-part of Ser. No. 336,065, Nov. 4, 1994, abandoned.

[51] Int. Cl.$^6$ ................................................. G05D 11/03
[52] U.S. Cl. ...................... 137/896; 137/599.1; 137/892; 251/126
[58] Field of Search ................ 137/599.1, 892, 137/895, 896; 417/168; 251/126

[56] References Cited

U.S. PATENT DOCUMENTS

| | | | |
|---|---|---|---|
| Re. 25,037 | 9/1961 | Brazier | 137/895 X |
| 2,873,758 | 2/1959 | Nielsen | 137/895 X |
| 3,188,055 | 6/1965 | Lutjens et al. | 137/892 X |
| 3,739,794 | 6/1973 | Lindgren | 137/1 |
| 4,344,752 | 8/1982 | Gallagher | 137/896 X |
| 4,519,423 | 5/1985 | Ho et al. | 137/896 X |
| 4,664,147 | 5/1987 | Maddock | 137/888 |

*Primary Examiner*—Stephen M. Hepperle
*Attorney, Agent, or Firm*—Hale and Dorr LLP

[57] ABSTRACT

An apparatus for inserting a venturi tube having an inlet, an aspirator inlet and an outlet directly within a fluid flow stream, with the aspirator inlet not in contact with the fluid flow stream is disclosed. A plate having a first aperture leading to the venturi inlet, and a series of second apertures both supports the venturi within a conduit and divides the fluid flow stream into a first stream which flows through the venturi tube and a second stream which flows around the venturi tube. A variety of adjusting mechanisms are disclosed for varying the cross sectional area of the second apertures relative to the cross sectional area of the venturi tube. The apparatus is adapted to allow the back pressure within the venturi tube (which increases as the fluid flow rate increases) to force an increasing proportion of the flow stream to flow around the venturi tube in order to maintain a relatively constant aspiration rate within the venturi tube. The adjustment mechanisms disclosed include a second plate, similar to the first plate, which is manually rotated and a blocking ring which moves responsive to changes in rate of flow of the fluid flow stream.

41 Claims, 11 Drawing Sheets

IN-LINE VENTURI

RELATED APPLICATION

This application is a continuation-in-part of U.S. application Ser. No. 08/336,065, filed 4 Nov. 1994, now abandoned.

FIELD OF THE INVENTION

The invention relates to a venturi tube apparatus.

BACKGROUND

Venturi tubes are well known in the art for introducing a second fluid into a first fluid. Typically, the inlet of the venturi tube is attached to a conduit for the first fluid, and the second fluid is introduced through a second inlet, hereafter called an aspirator inlet, so that the combined fluid exits through the venturi's outlet. In operation, the gas or liquid to be introduced is sucked into the venturi through the aspirator inlet, as the fluid flows through the venturi tube. For a given venturi tube, the aspiration rate depends on the flow rate of the fluid which passes through the venturi inlet and the viscosity of the fluids.

One of the major problems associated with conventional venturi tubes is that any single tube can only operate over a narrow range of fluid flow rates. This is in part because back pressure produced within the venturi increases greatly with increases in the fluid flow rate. It is known that this problem can be overcome by connecting an external bypass system to the fluid conduit, in parallel to a venturi tube, so that a portion of the fluid flow stream flowing through the conduit bypasses the venturi by flowing through the bypass system. Conventional bypass systems have several limitations including being costly, bulky and requiring complex plumbing which hinders easy installation in association with an existing fluid conduit.

There exists a need for a simple venturi tube apparatus which can be added easily to an existing fluid carrying conduit and which can operate over a wider range of fluid flow conditions.

SUMMARY OF THE INVENTION

The invention provides for the insertion of a venturi tube directly within a fluid flow stream. A broad aspect of the invention provides an apparatus for use within a conduit for a fluid flow stream comprising a venturi tube having an inlet, an aspirator inlet and an outlet; and supporting means for supporting said venturi tube within said conduit in such a manner that said venturi tube is aligned axially in the direction of said flow stream with the aspirator inlet not in contact with the fluid flow stream.

Another aspect of the invention provides a fluid flow control means which divides the fluid flow stream into a first stream which flows through the venturi tube and a second stream which flows around the venturi tube. The fluid flow control means is adapted to allow the back pressure within the venturi tube (which increases as the fluid flow rate increases) to force an increasing proportion of the flow stream to flow around the venturi tube in order to maintain a relatively constant aspiration rate within the venturi tube. This permits a relatively constant and consistent operation of the venturi tube over a wider range of fluid flow rates by increasing the flow rate of the second stream rather than increasing the flow rate of the first stream as the rate of the fluid flow stream increases.

In another aspect, the invention provides means for inducing a vortex in the second stream, preferably at or near the venturi tube outlet. This induced vortex produces a surprising increase in the venturi effect and reduces backpressure at any given fluid flow rate. In addition, the vortex increases the mixing action of the first and second streams. The induced vortex permits more constant flow rates in the first stream, yielding a satisfactory venturi effect over a wider range of fluid flow rates.

Another aspect of the invention provides for reduced pressure at the venturi tube outlet by means of an increased pipe diameter at that point relative to the diameter of the fluid flow inlet pipe. Preferably, this increased pipe diameter persists over a distance of about 1 to about 4 pipe diameters extending from the venturi outlet; even more preferably, over a distance of about 2 to about 3 diameters from that point.

In another aspect the invention is directed to an aspirator inlet having, at its point of intersection with the venturi tube, a diameter selected so as to achieve a desired flow velocity (or range of flow velocities) as the second fluid is introduced into the first fluid. Preferably, the inner diameter of the aspirator inlet will be selected so as to achieve, in conjunction with the other components of the invention as described herein, high flow velocities, which may be subsonic, sonic or hypersonic, over at least a portion of the operating range of fluid flow rates for a given system.

In a preferred embodiment of the invention the in-line venturi comprises vortex inducing means and increased fluid flow outlet diameter relative to the fluid flow inlet pipe diameter. In a particularly preferred embodiment, the aspect ratio is adjusted so as to provide for optimal vortex formation under the particular flow conditions of the system, and the aspirator inlet comprises an aspirator tube.

In a preferred embodiment of the invention the supporting means comprises a plate or disc inserted within the conduit (or integral therewith). The fluid flow control means comprises first passage means through said plate or disc for allowing said first stream to flow through said venturi tube and second passage means, preferably in the form of at least one aperture, through said plate or disc, for allowing said second stream to flow. The aspiration rate of the venturi tube, for a given fluid flow rate, is determined by the cross sectional area of the venturi tube relative to the cross sectional area of the second passage means. The cross section of the second passage means can therefore be preset for a given venturi tube to be used within a fluid flow stream having a given flow rate, in order to achieve a desired aspiration rate.

Preferably said fluid flow control means further comprises adjusting means for adjusting the flow rate of the second stream, typically by adjustably blocking (or unblocking) said second passage means, in order to maintain a relatively constant flow rate through the venturi tube. Thus the total cross sectional area of the at least one aperture of the second passage means, relative to the cross sectional area of the venturi tube, can be adjusted by varying the extent the apertures of the second passage means are blocked. This allows for a greater range of flow rates of the fluid flow stream to be used with a given venturi tube to produce a desired aspiration rate.

In one embodiment, the adjusting means allows for adjustment of the extent to which the second passage means is blocked.

In another embodiment, the adjusting means includes regulating means, responsive to changes in the fluid flow rate for regulating the flow rate of the second stream. In one such embodiment, the regulating means comprises a blocking means which is biased towards the plate (or disc) by some resilient means, so as to block the second passage means. The blocking means is moved away from the second passage means, against the bias of the said resilient means, by the fluid flow stream as the flow rate (and resulting pressure) increases. Furthermore, both such adjusting means can be utilized together, if desired.

In some applications (for example in cases of high back pressure downstream from the venturi tube), it is desirable to increase the pressure drop across the venturi tube. This acts to increase the aspiration rate of the venturi tube. Consequently, another aspect of the invention provides for an optional constriction means for reducing the pressure at the venturi tube outlet, by constricting the flow of the second stream, in the vicinity of the venturi tube outlet.

In another embodiment, the invention comprises a venturi support body having, at the fluid inflow end, a concave face which acts to direct the incoming fluid stream toward a central aperture and therethrough into a venturi tube which is partly integral to the venturi support body and partly a separate tube held in close apposition against a mating surface on the venturi support body, in which the separate venturi tube further comprises one or more flow directors which cause the formation of a vortex in a portion of the fluid stream which is diverted through a series of apertures surrounding the central aperture as a function of increasing back pressure within the venturi tube, and in which the diameter of the fluid flow outlet pipe is greater than the diameter of the fluid flow inlet pipe over a distance of not less than between about 2 and about 3 outlet pipe diameters beginning at the venturi tube outlet.

These foregoing aspects of the invention, together with other aspects and advantages thereof, will be more apparent from the following description of the preferred embodiments thereof, taken in conjunction with the following drawings.

DETAILED DESCRIPTION OF THE PREFERRED EMBODIMENTS

Figure 1:
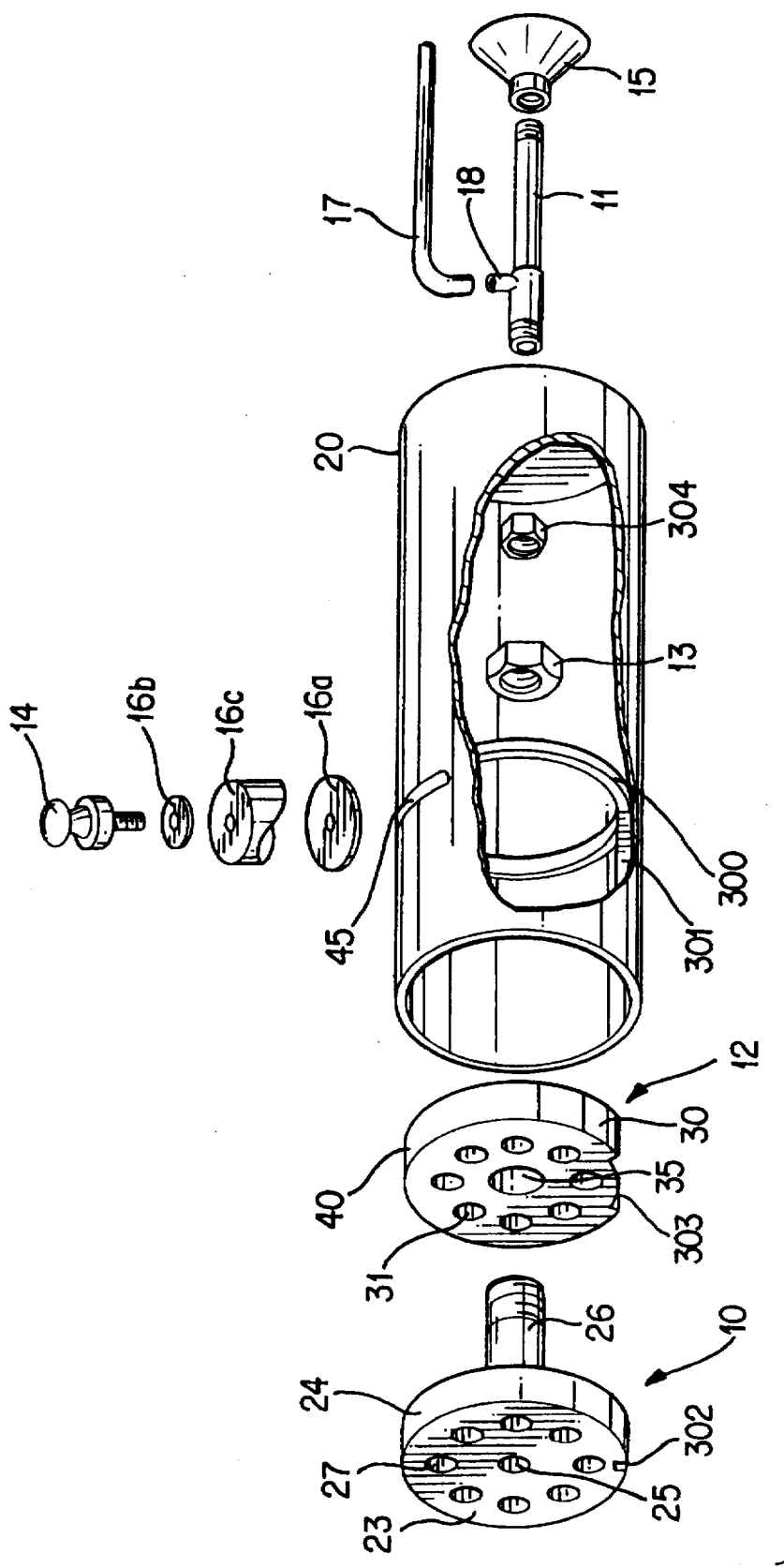
FIG. 1 is an exploded, perspective view of a preferred embodiment of the present invention, with the conduit shown in partial cutaway.
Figure 2:
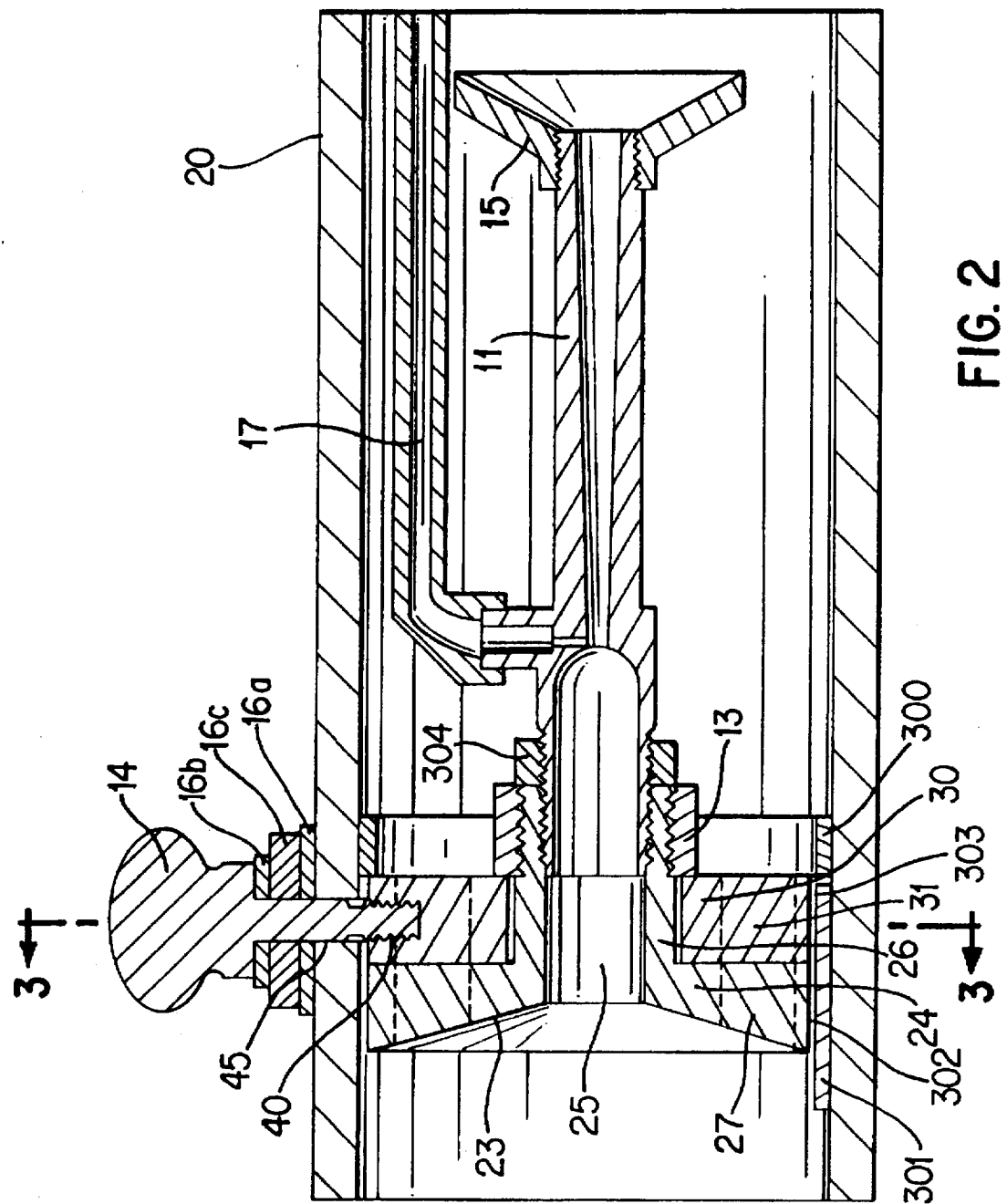
FIG. 2 is a cross sectional view of the assembled parts illustrated in FIG. 1.

FIGS. 1 and 2 show a preferred embodiment of the present invention installed within a conduit 20 through which a fluid can flow in a stream. In this embodiment a venturi support body, shown generally at 10, comprises a disc 24 which is sized to closely fit within cylindrical conduit 20. Any suitable means for securing disc 24 in a sealing relationship within the conduit 20 can be used (for example, a suitable adhesive, a shoulder, or disc 24 and conduit 20 can be molded as one integral unit). The securing means should be sufficiently strong to withstand the pressures of the fluid flow stream and so keep the support body in sealing relationship with the conduit. In the preferred embodiment shown in FIGS. 1 and 2, an inner seating ring 300, attached to the inside of conduit 20, prevents downstream movement of disc 24, while allowing withdrawal of the unit, in the upstream direction, for maintenance if necessary. A key 301, attached to the inside of conduit 20, fits through keyway 302 in disc 24 to prevent rotation of disc 24.

Face 23 of disc 24, which faces the fluid flow stream, is preferably concave. Preferably located centrally within face 23 is aperture 25 leading into pipe 26 which extends axially from disc 24 on the side remote from face 23. Pipe 26 can be integral with disc 24 or connected thereto. Disc 24 also has apertures 27 which allow the fluid flow stream to pass through Disc 24. Disc 24 acts to obstruct the fluid flow stream so that all the flow must be through apertures 25 or 27. In the preferred embodiment shown, apertures 27 are circular holes through disc 24, arranged in a circular pattern around aperture 25. Apertures 27 can vary in size, shape, and orientation.

Preferably an adjusting means is included to adjust the flow rate of the second stream (i.e., the portion of the fluid flow stream which flows around the venturi tube), by adjustably blocking (or unblocking) apertures 27. This adjustment means can either be adjustable, automatic (i.e., responsive to changes in the fluid flow rate) or a combination thereof.

Figure 3:
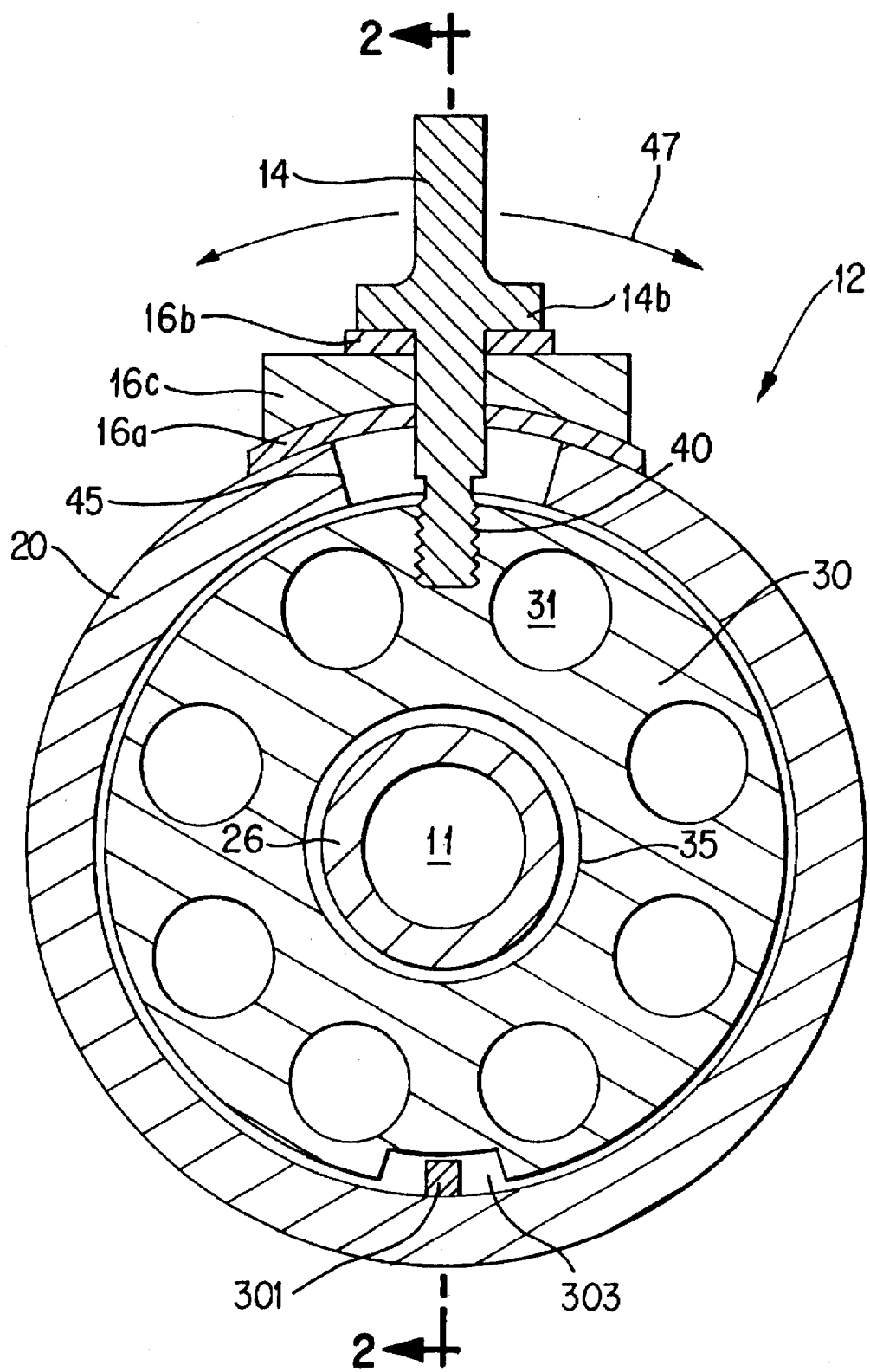
FIG. 3 is a cross sectional view taken along line 3—3 of FIG. 2.

In the preferred embodiment shown in FIGS. 1 and 2, adjusting means, generally shown at 12, allows for the external adjustment of the extent to which the apertures 27 are blocked. In this embodiment, adjusting means 12 comprises a disc 30 which is able to rotate with respect to disc 24, such as by being journalled on pipe 26. Disc 30 includes central aperture 35 for receiving pipe 26. Disc 30 also has apertures 31 which preferably are similar in size and spacing to apertures 27 of disc 24. Disc 30 obstructs the flow of the fluid stream through apertures 27, except for flow through apertures 31, which depends on the extent to which apertures 31 are in axial alignment with apertures 27. By rotating disc 30 with respect to disc 24, the degree of axial alignment of apertures 31 with respect to apertures 27, and thus the extent apertures 27 are blocked, is adjusted. FIGS. 1, 2, and 3 show one form of rotation means for rotating disc 30. In this embodiment, disc 30 includes a threaded hole 40 adapted to receive actuator 14. As can be seen in FIG. 3, actuator 14 extends outwardly through slot 45 of conduit 20, gasket 16b, gasket 16a and washer 16c. Actuator 14 comprises a threaded bolt for engaging threaded hole 40, a handle which acts as a lever, and a shoulder 14b for engaging gasket 16b. Keyway 303 ensures that disc 30 is not obstructed by key 301 as the disc is rotated or during withdrawal of the assembly.

During normal operation, actuator 14 is screwed down in its tightened position. Shoulder 14b presses against gaskets 16b and 16a which serve to seal against leaks through washer 16c and slot 45 respectively, and also frictionally maintains disc 30 in a fixed position. In order to rotate disc 30, actuator 14 is externally loosened sufficiently so that it is free to move with respect to conduit 20, but so that a portion of it remains within threaded hole 40. Actuator 14 is then moved, as shown by arrows 47 in FIG. 3, in order to rotate disc 30. Actuator 14 is then retightened in order to prevent further rotation of disc 30 with respect to disc 24. Alternative rotation means can be implemented. For example disc 30 can be provided with a one part of a worm gear or bevel gear arrangement (not shown), with the mating gear arrangement on a member (not shown) which extends through the conduit 20. Thus, by rotating the member from outside the conduit, the gear arrangement will rotate the disc 30.

A locking nut 13, screwed onto pipe 26 against a shoulder, maintains disc 30 in close proximity to disc 24, but with a sufficient gap so as to allow disc 30 to rotate. Pipe 26 is connected, for example by means of a threaded connection and optional locking nut 304, to the inlet of the venturi tube 11. In this embodiment, the venturi tube is supported within the conduit by pipe 26, which is in turn supported by disc 24, and aperture 25 acts as an inlet passage through disc 24 leading to pipe 26, and hence to the venturi tube inlet. Locking nut 304 prevents rotation of the venturi tube with respect to the pipe 26. Alternative supporting means can be provided while remaining within the scope of the invention. For example, the venturi tube 11 can be directly received and seated in aperture 25 of disc 24, with disc 30 journalled on venturi tube 11. Alternatively, pipe 26 can be flexible, and the venturi tube can be supported by spacer arms or struts which extend from it to the conduit wall.

Tube 17 leading to aspirator inlet 18 of venturi tube 11, is used for introducing a gas or liquid into the venturi tube. Tube 17 leads to an external source (not shown) of the gas or liquid to be introduced or can additionally include a pressure gauge (not shown), if desired. Depending on the application, tube 17 can either extend directly through a bore hole in the conduit 20 (not shown), or penetrate through the wall of the conduit 20 through a conventional compression fitting (not shown) at a convenient point along the conduit 20.

In operation the fluid flow stream within conduit 20 is diverted into inlet passage 25 and apertures 27 of disc 24 by face 23. Preferably face 23 is concave in order to help funnel a portion of the fluid flow stream (i.e., the first stream) through inlet passage 25 and consequently into venturi tube 11, by means of pipe 26. For any given flow rate of the fluid flow stream, the flow rate of the first stream, and the flow rate of the second stream (i.e., the portion which flows through apertures 27) depends on the relative cross sectional area of the apertures 27 compared with the cross sectional area of the venturi tube 11, and the back pressure produced within venturi tube 11. As the fluid flow rate increases, the resulting back pressure within venturi tube 11 increases, thereby forcing a larger proportion of the flow stream to flow through apertures 27 (i.e., increases the flow rate of the second stream), rather than increasing the flow rate through venturi tube 11. Thus, although any given venturi tube can only operate effectively for a narrow range of flow rates, the invention allows for operation of the venturi tube over a greater range of fluid flow stream flow rates than would be possible with the venturi tube alone, by keeping the flow rate of the first stream relatively constant over the greater range.

If the flow rate of the fluid flow stream is approximately constant, the size of apertures 27 can be predetermined to produce a desired flow rate through the venturi tube 11.

However if the flow rate of the fluid flow stream is variable, then optional adjusting means 12 is preferably added for adjusting the effective cross sectional area of the apertures 27 (in relation to the cross sectional area of the venturi tube 11). In the preferred embodiment shown in FIGS. 1 and 2, this adjustment is made by rotating disc 30, changing the axial alignment of apertures 31 and 27, thereby adjusting the degree to which apertures 27 are blocked by disc 30, as hereinbefore discussed. These adjustments change the relative cross sectional area of the apertures 27 in relation to the cross sectional area of the venturi tube. This accordingly will change the relative proportions of the first and second streams for any constant flow rate of the fluid flow stream. Thus for any constant flow rate, for a given set of fluids, the flow rate of the first stream, and hence the aspiration rate, can be set by appropriately rotating disc 30. Furthermore, this aspiration rate can be monitored by means of a gauge (not shown) located on tube 17, without visual access to the interior of the conduit and without opening the venturi tube assembly within the conduit.

In some applications (for example in cases of high back pressure downstream from the venturi tube), it is desirable to increase the rate of flow through the venturi tube. Consequently, another aspect of the invention provides for an optional means for reducing the pressure at the venturi tube outlet, by constricting the flow of the second stream, in the vicinity of the venturi tube outlet. This operates to increase the drop in pressure across the venturi tube, thus increasing its aspiration rate. A preferred means for reducing the pressure at the venturi tube outlet is shown in FIGS. 1 and 2 as the optional flow diverter 15 affixed to the outlet of the venturi tube. Flow diverter 15 narrows the effective size of the conduit 20 in the vicinity of the venturi tube outlet. The second stream is therefore forced through the gap between the diverter 15 and the conduit 20. This increases the flow rate of the second stream as the second stream flows through the gap between diverter 15 and conduit 20, thus increasing the suction at the outlet end of the venturi tube. Flow diverter 15 is preferably conically shaped, in order to reduce resistance to the fluid flow. Other means for reducing the effective size of the conduit in the vicinity of the venturi tube outlet can be employed. For example, a ring extending radially inward from the inside perimeter of the conduit (not shown) can be utilized.

Figure 8:
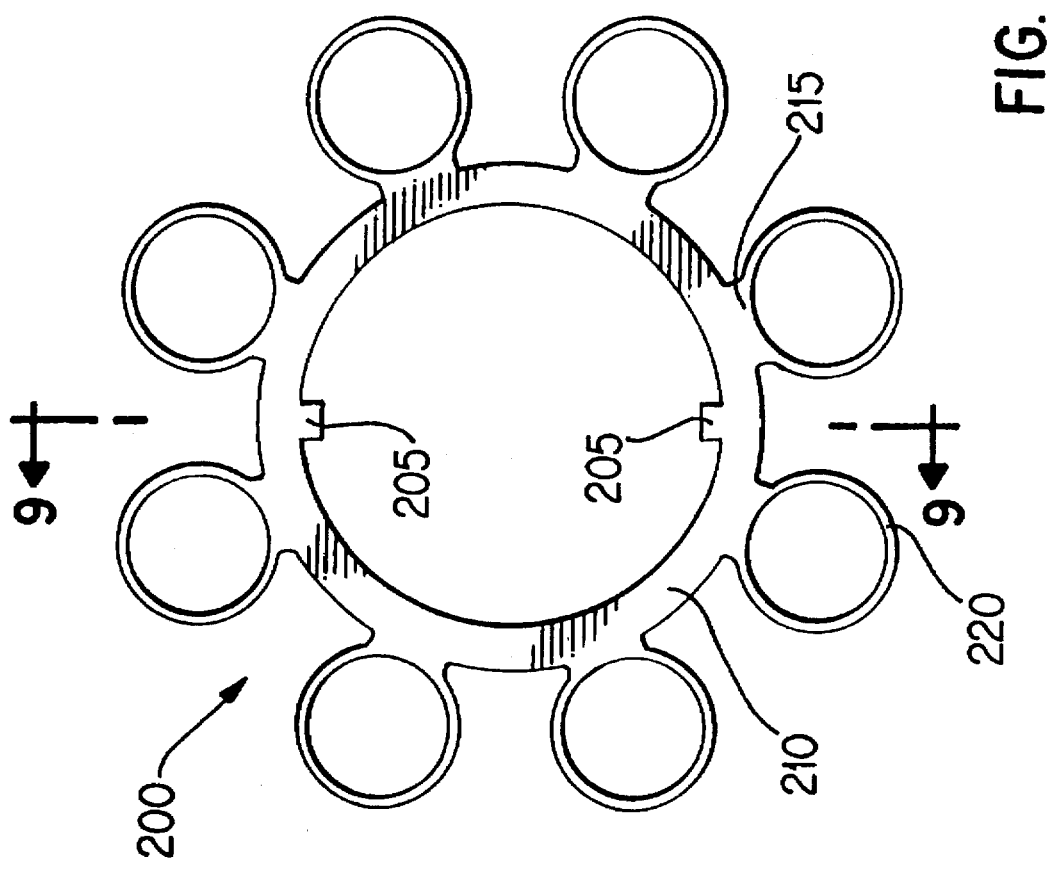
FIG. 8 is a front plan view of the alternative regulating means of FIGS. 6 and 7.
Figure 9:
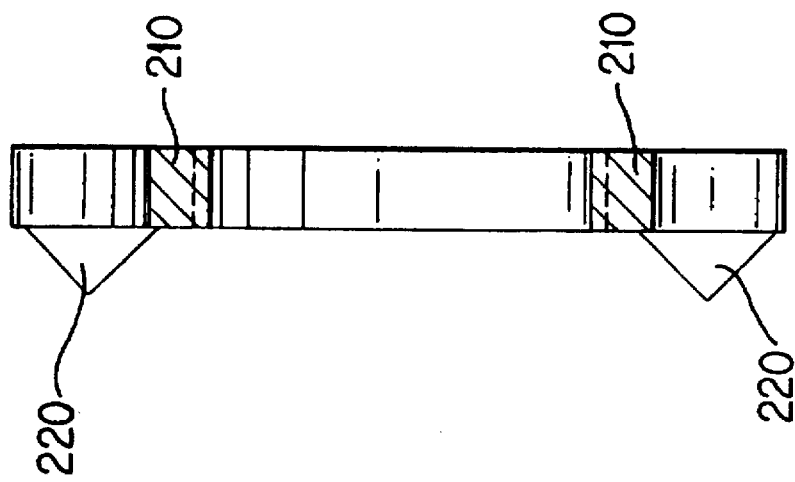
FIG. 9 is a cross sectional view along line 9—9 of FIG. 8 with the spokes 215 shown in phantom.

An alternative adjusting mechanism, not shown, for the rotating disc 30 is a blocking mechanism, for blocking apertures 27, which moves axially towards or away from the disc 24. In this embodiment, rather than rotating the adjusting mechanism, the effective size of the apertures 27 (in relation to the diameter of the venturi tube 11) is adjusted by axially moving a series of blockers (one for each aperture 27) away from, or closer to, the apertures 27. Each blocker can, for example be conically shaped and sized to totally occlude each aperture 27 if fully inserted within aperture 27, and partially occlude aperture 27 if partially withdrawn. Each blocker can conveniently be attached to a central hub by a spoke, for example, as illustrated in FIGS. 8 and 9. The hub can then be axially moved in order to vary the gap between the blockers and the apertures and thus the effective size of the second passage means through which the second stream can flow.

Figure 4:
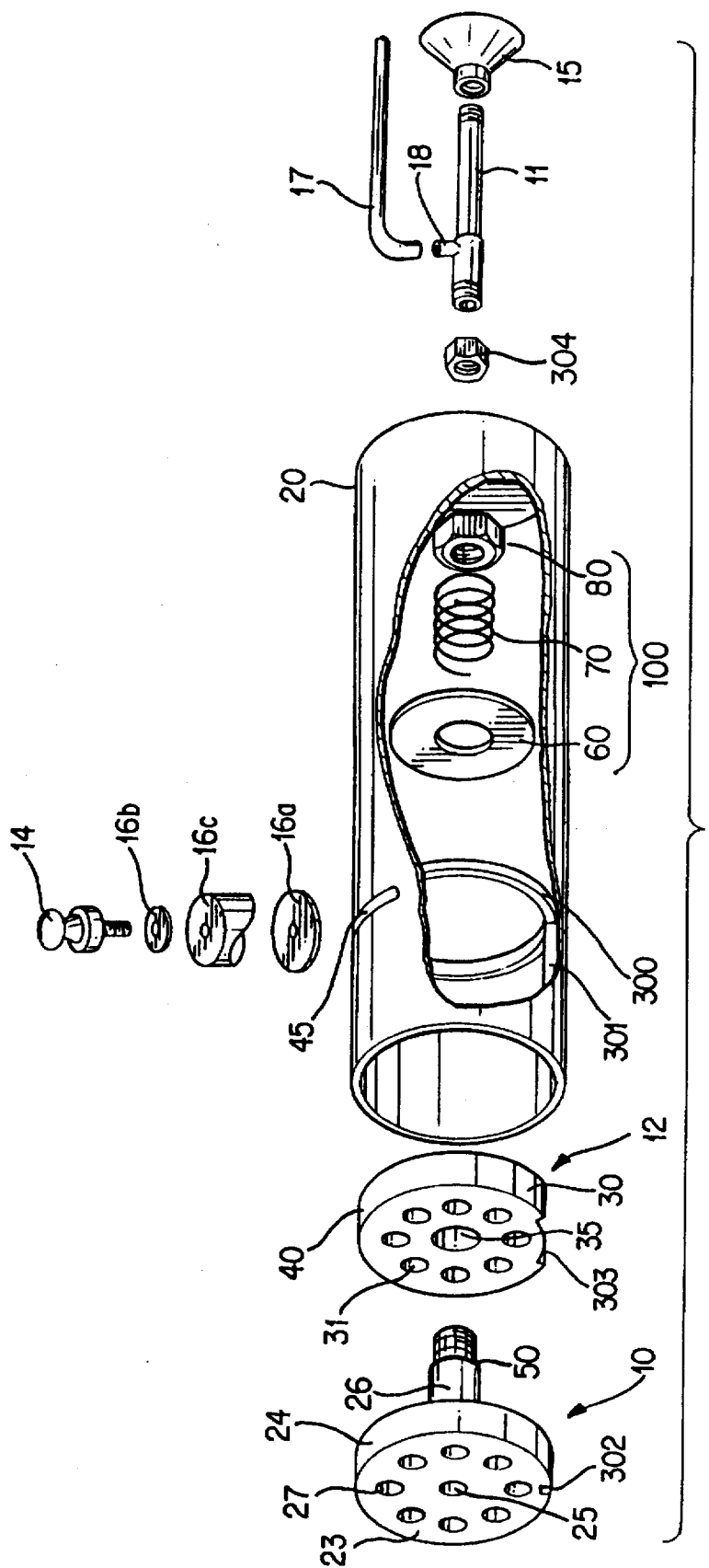
FIG. 4 is an exploded, perspective view of another embodiment of the present invention, with the conduit shown in partial cutaway.
Figure 5:
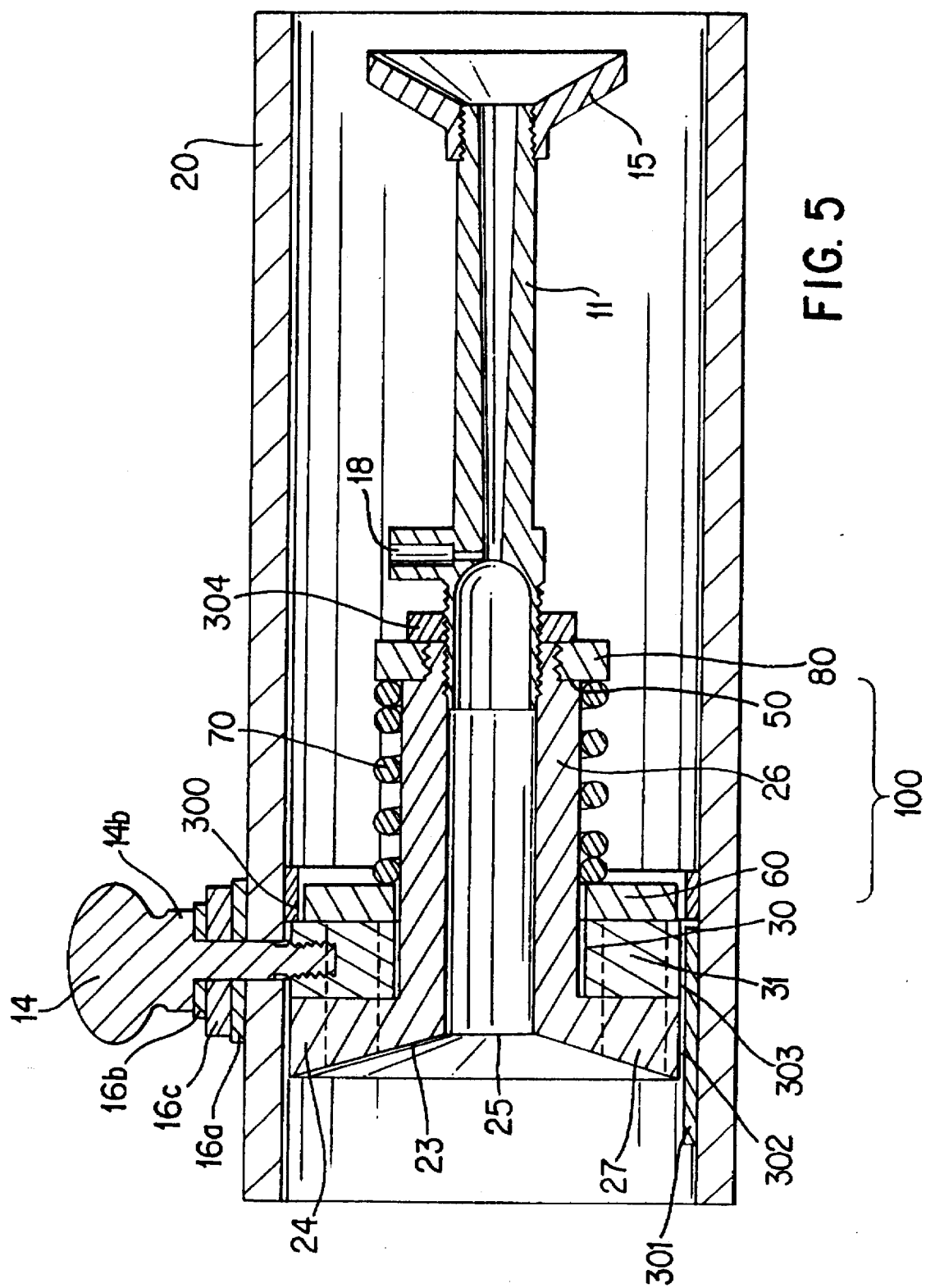
FIG. 5 is a cross sectional view of the assembled parts illustrated in FIG. 4, but with the tube 17 omitted for clarity.

FIGS. 4 and 5 illustrate another embodiment of the invention, wherein an automatic adjustment means for regulating the flow rate of the second stream, responsive to changes in the fluid flow rate, has been added to the embodiment shown in FIGS. 1 and 2. In the embodiment shown in FIGS. 4 and 5, this regulating means, generally shown at 100, is illustrated for use in conjunction with the manually rotatable disk 30 of FIGS. 1 and 2. It should be noted that the regulating means 100 can also be used without disk 30. FIGS. 4 and 5 show essentially the same apparatus as shown in FIGS. 1 and 2, with the corresponding parts labelled with the same numbers as that of FIGS. 1 and 2, except for a change to the thread and shoulder arrangement on pipe 26; the addition of automatic adjustment means 100; and the removal of locking nut 13.

Blocking ring 60 is mounted on pipe 26 for axial movement towards and away from disc 30. A helical spring 70 and a locking nut 80 are mounted on pipe 26, with locking nut 80 adjacent pipe shoulder 50. A second locking nut 304, adjacent locking nut 80, prevents the venturi 11 from rotating. Spring 780, which is held in place by locking nut 80, biases blocking ring 60 against disc 30 such that ring 60 blocks apertures 31. The pressure of the fluid flow stream within the conduit 20 exerts a force on blocking ring 60 against the bias of spring 70. As the pressure increases, so does the force. Thus, under low flow stream rates, spring 70 biases blocking ring 60 against disc 30, blocking apertures 31, thus forcing the majority of the flow stream (or all the flow stream if blocking ring 60 totally occludes apertures 31) into the venturi tube. As the flow rate of the flow stream increases the resulting pressure increase acting on blocking ring 60 moves blocking ring 60 away from apertures 31, against the bias of spring 70, allowing fluid to flow through apertures 31. Thus, as the pressure increases, the proportion of the fluid flow stream flowing through the apertures 31 increases until blocking ring 60 has moved sufficiently away from ring 30 so as to offer no significant resistance to the flow.

In this embodiment, the disc 30 is rotated in order to adjust the initial effective sizes of the apertures through which the second stream can flow. The blocking ring 60 will then regulate the actual flow through the apertures, allowing increased flow through the apertures as the flow rate (and resulting fluid pressure) increases, and allowing decreased flow through the apertures as the flow rate of the fluid flow stream decreases. Thus as the flow rate increases, the portion of the fluid flow stream flowing through the venturi tube will remain constant, but the second stream will increase. If disc 30 is not utilized, the blocking ring 60 is biased towards disc 24, in order to regulate the flow through apertures 27. Furthermore, alternative resilient means can be substituted for spring 70.

Figure 6:
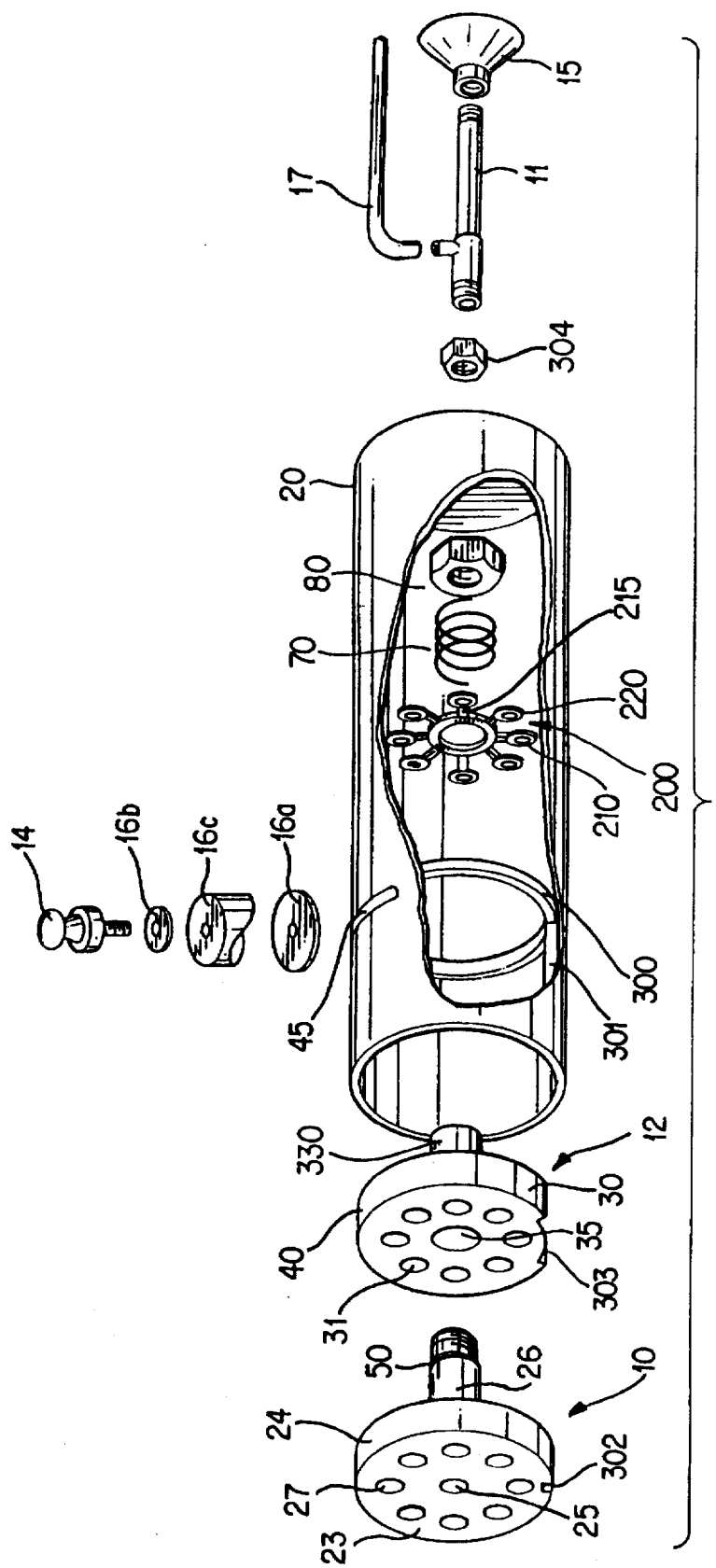
FIG. 6 is an exploded, perspective view of a variation of the embodiment shown in FIGS. 4 and 5, showing an alternative regulating means.
Figure 7:
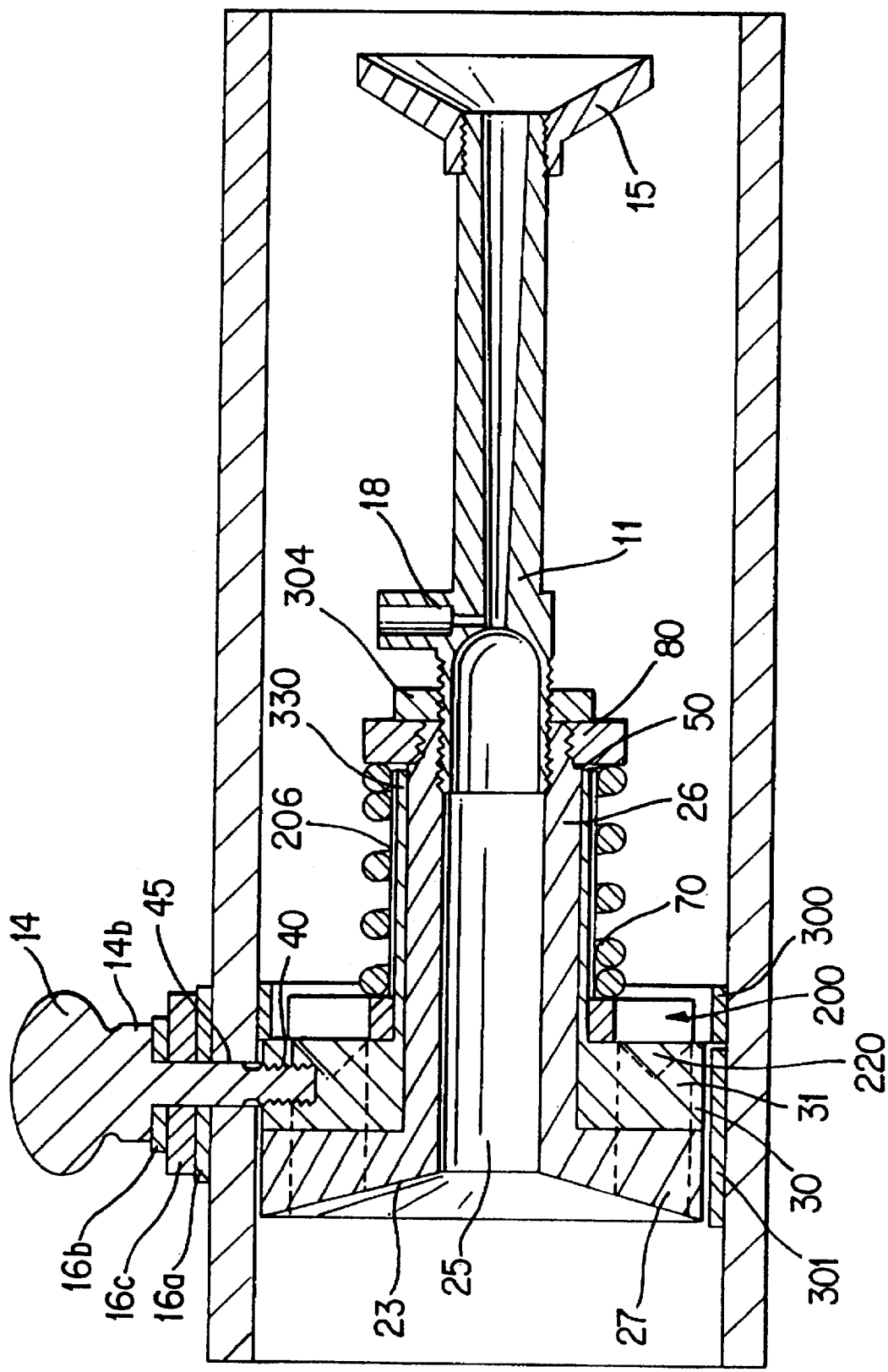
FIG. 7 is a cross sectional view of the assembled parts illustrated in FIG. 6, but with the tube 17 omitted for clarity.

An alternative regulating means is shown generally at 200 in FIGS. 6, 7, 8 and 9, replacing the blocking ring 60 of FIGS. 4 and 5. This alternative regulating means 200 comprises a series of blockers 220 sized and shaped to block apertures 31, or alternatively apertures 27, if disc 30 is not utilized. These blockers are supported by spokes 215 which extend radially outward from a hub 210. Blockers 220 are resiliently biased against apertures 31 by a resilient means, such as helical spring 70, as shown in FIGS. 6 and 7.

In this embodiment, a means is necessary to maintain alignment of blockers 220 with apertures 31 if disc 30 is rotated. As seen in FIGS. 6 and 7, disc 30 is provided with an axially extending sleeve 330 which surrounds pipe 26. As shown in FIG. 8, key 205 extends radially inward from hub 210 for sliding axial movement within keyway 206 (as shown in FIG. 7) of sleeve 330. Thus, hub 210 can move axially along sleeve 330, but key 205 within keyway 206 prevents rotation of hub 210 with respect to disc 30. In operation, regulating means 200 works in the same manner as blocking ring 60 in FIGS. 4 and 5, but provides easier flow for the second stream once the pressure of the fluid flow stream has moved the regulating means 200 away from the disc 30. Alternatively, hub 210 can be fixed in place, with spokes 215 longer than shown and constructed from a sufficiently resilient material so as to act as a living hinge, with the resiliency of spokes 215 biasing the blockers 220 to block apertures 31.

Figure 10:
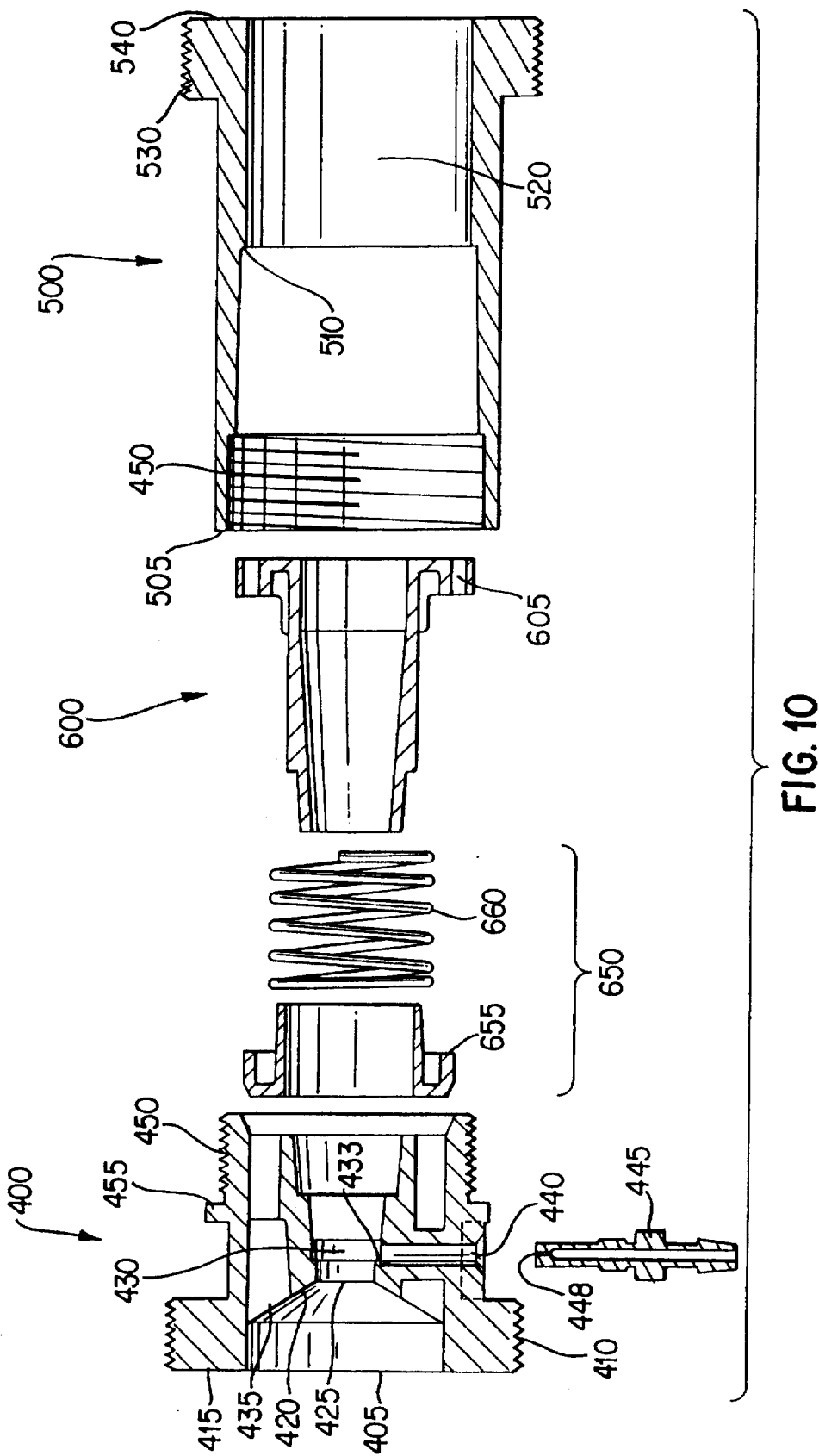
FIG. 10 is an exploded, cross sectional view of a preferred embodiment of the invention.
Figure 11:
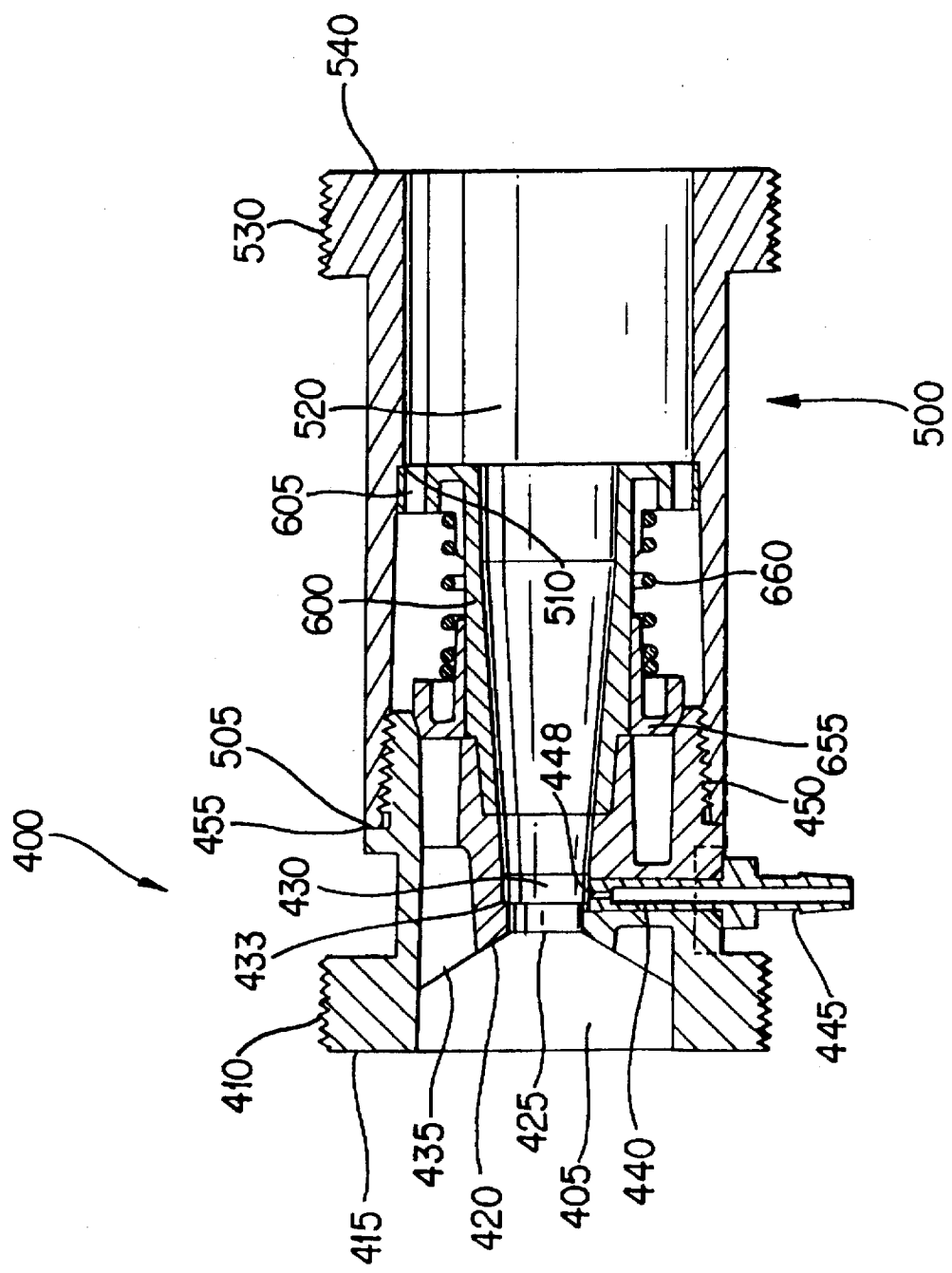
FIG. 11 is a cross sectional view of the assembled parts shown in FIG. 10.
Figure 12:
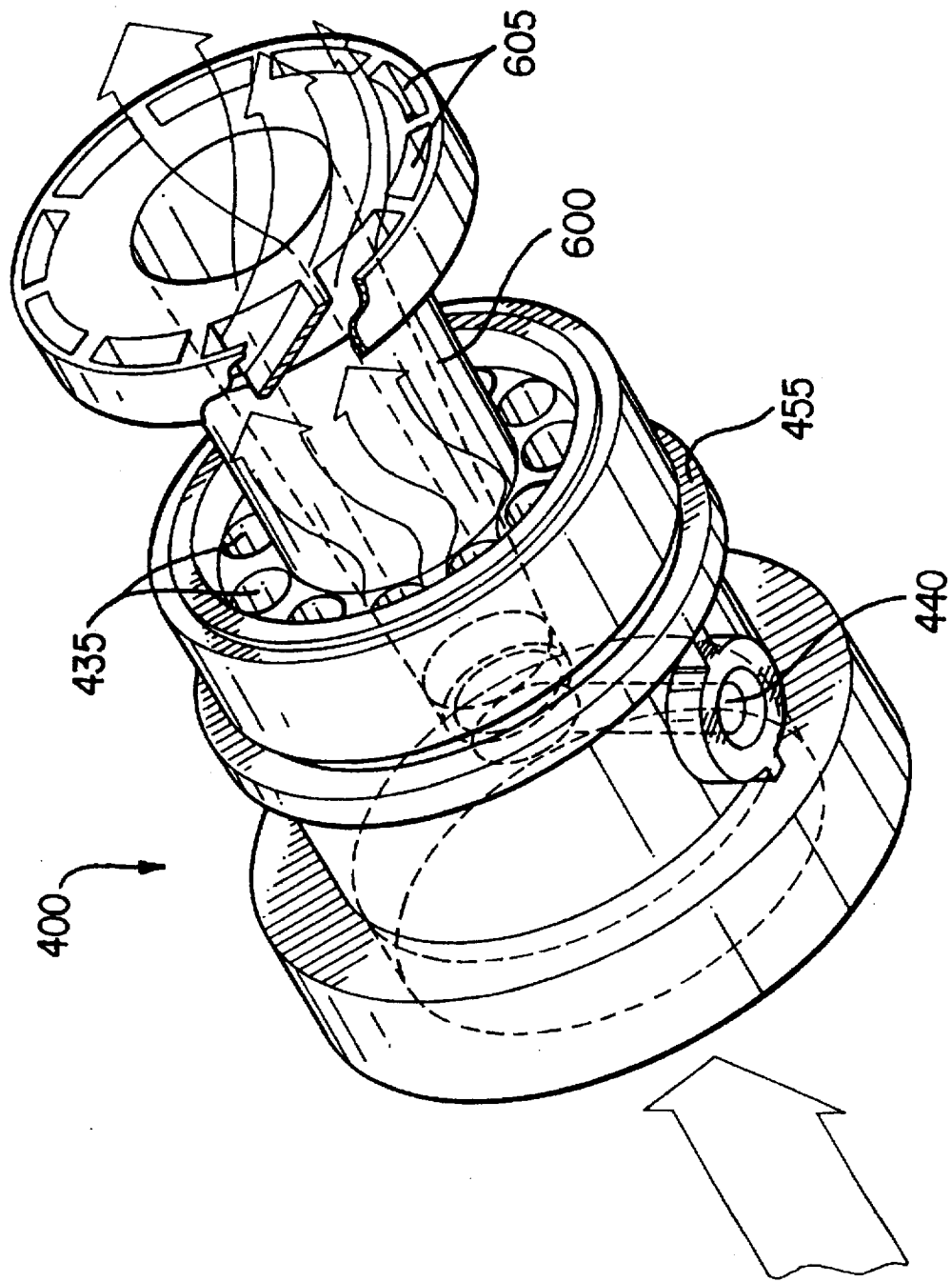
FIG. 12 is a perspective view of the embodiment shown in FIGS. 10 and 11, with flow directors 605 shown in partial cutaway, omitting adjusting means 650 and conduit 500 for clarity.

FIGS. 10, 11 and 12 show another preferred embodiment of the present invention. In this embodiment a venturi support body, shown generally at 400, comprises a fluid flow inlet 405 having a diameter approximately equal to the diameter of the fluid supply inflow pipe (not shown), venturi support body 400 being removably sealably connected to the fluid supply inflow pipe by means of a standard compression fitting using threads 410. Any suitable means for securing venturi support body 400 in a sealing relationship with the fluid supply inflow pipe can be used. For example, the base 415 of venturi support body 400 may have a concentric groove sized so as to receive an O-ring which seals against a suitable face of the fluid supply inflow pipe (not shown).

In the preferred embodiment shown in FIGS. 10 and 11, venturi support body 400 comprises a face 420 which faces the fluid flow stream and is preferably concave. Preferably located centrally within face 420 is aperture 425, having a diameter approximately 0.100" less than the inlet diameter of integral venturi 430 to which it leads, resulting in shoulder 433. As shown in FIGS. 10 and 11, beginning at shoulder 433, integral venturi 430 is cylindrical at the point of entry of aspirator inlet 440 and for a short distance beyond aspirator inlet 440, after which it is frustoconical. Face 420 also has apertures 435 which allow the fluid flow stream to pass through venturi support body 400. Face 420 acts to obstruct the fluid flow stream so that all the flow must be through apertures 425 or 435. In the preferred embodiment shown, apertures 435 are circular holes through venturi support body 400, arranged in a circular pattern around aperture 425. Apertures 435 can vary in size, shape and orientation. In the preferred embodiment shown, aspirator inlet 440 is sized to receive aspirator tube 445 by means of a threaded connection.

Venturi support body 400 is sealably removably connected to conduit 500. In the preferred embodiment shown, the sealable, reversible connection means comprise matching left-hand thread 450 on venturi support body 400 and conduit 500, and shoulder 455 in venturi support body 400 which can support an O-ring (not shown) against which the end of conduit 500 sealably bears as it is drawn toward shoulder 455. Any suitable sealing means may be employed; for example, shoulder 455 itself can act as the sealing surface against which the inlet end 505 of conduit 500 may bear when conduit 500 is threaded onto venturi support body 400. Threads 530 allow conduit 500 to be sealably, removably connected to the fluid supply outflow pipe (not shown) by means of a standard compression fitting. Any suitable means for securing conduit 500 in a sealing relationship with the fluid supply outflow pipe can be used. For this purpose, for example, outlet end 540 of conduit 500 is preferably sized to match the diameter of the fluid supply outflow pipe and includes a concentric groove sized to receive an O-ring (not shown) which seals against a suitable surface of the fluid supply outflow pipe (not shown). Fluid flow outlet 520 of conduit 500 has a diameter which, in the preferred embodiment shown, is greater than the diameter of fluid flow inlet 405 of venturi support body 400.

Shoulder 510 of conduit 500 bears against venturi tube 600, which, in turn, fits in closely mating surfaces of venturi support body 400. In the preferred embodiment shown, venturi tube 600 comprises flow directors 605 which are angled with respect to the direction of the second stream (i.e., the portion of the fluid flow stream which flows through apertures 435). Adjusting means 650 comprises disk 655 and helical spring 660.

The preferred embodiment of FIG. 10 is shown assembled in FIG. 11. Venturi support body 400 and conduit 500 are shown sealably drawn together by means of left-hand threads 450. Shoulder 510 forces venturi tube 600 into venturi support body 400 such that venturi tube 600 forms an extension of integral venturi 430. It is not necessary that venturi tube 600 mate precisely with venturi support body 400 as shown in FIG. 11; for example, where an O-ring is interposed between shoulder 455 of venturi support body 400 and inlet end 505 of conduit 500 to effect a seal (not shown), a gap between the mating surfaces of venturi support body 400 and venturi tube 600 will exist which is equal in size to the compressed O-ring diameter, and such a gap will not impede the desired venturi effect. Helical spring 660 biases disk 655 against apertures 435 of venturi support body 400, and simultaneously biases venturi tube 600 against shoulder 510 of conduit 500.

In operation, the fluid flow stream from the fluid supply inflow pipe enters fluid flow inlet 405 and is diverted into apertures 425 and 435 by face 420. The preferred concavity of face 420 assists in funneling a portion of the fluid flow stream (i.e., the first stream) through aperture 425 and into the venturi formed by integral venturi 430 and venturi tube 600. At a given fluid flow stream flow rate, the first stream flow rate and the second stream flow rate (i.e., the rate of the flow of that portion of the fluid flow stream which flows through apertures 435) is a function of the ratio between the cumulative cross-sectional area of apertures 435 and the cross-sectional area of aperture 425, and of back pressure produced within the venturi tube. These values typically will be selected in order to achieve a desired (preferably, a relatively constant) amount of venturi draw or suction over the anticipated operational range of fluid flow stream flow rates for the system.

In practice, the cross sectional area of aperture 425 typically will be selected in order to achieve the desired venturi draw at the low end of the operational range. At low fluid flow stream flow rates, disk 655 is biased against apertures 435 by helical spring 660, with the result that apertures 435 are occluded and substantially all of the fluid flow passes through aperture 425. As the fluid flow rate increases, the increase in back pressure within the venturi tube forces an increasing proportion of the fluid flow stream through apertures 435, which are progressively opened as the force of the second stream flow overcomes the bias of disk 655 against apertures 435 from helical spring 660. Adjusting means 650, then, acts to maintain a relatively constant fluid flow rate of the first stream over a range of second stream flow rates. Thus, where the range of the fluid flow rates is known for a given system, the characteristics of helical spring 660 may be selected such that adjusting means 650 produces an acceptable flow rate of the first stream through the venturi tube over that range.

In the embodiment shown, the ratio of the cross sectional area of aperture 425 to the cumulative cross sectional area of apertures 435 is approximately 1:2, and typically will be selected such that the first stream flow rate and the second stream flow rate are approximately equal over the operational range.

As described above, it is frequently desirable to increase the rate of flow through the venturi tube. In the preferred embodiment shown in FIGS. 10–12, the pressure at the venturi tube outlet is decreased due to the fact that the diameter of the fluid flow outlet 520 is greater than the diameter of the fluid flow inlet 405. While any increase in fluid flow outlet 520 diameter over fluid flow inlet 405 diameter will produce increased flow rate through the venturi tube, it is preferred that the increase in pipe diameter be between about 25% and about 75%; more preferably, between about 35% and about 65%; and even more preferably, about 50%. The length of the increased pipe diameter, measured from the outlet of venturi tube 600 (which, in the embodiment shown, corresponds to the location of shoulder 510), should be a minimum of between about 1 and about 4 pipe diameters; preferably between about 2 and about 3 pipe diameters. Longer lengths will, of course, also work.

As shown in FIG. 12, venturi tube 600 comprises flow directors 605 which are oriented at an angle to the direction of the second stream as it emerges from apertures 435 and passes disk 655. As the second stream passes through flow directors 605, a vortex is created in the fluid flow outlet 520 portion of conduit 500. The angle at which flow directors 605 intersect the direction of the second stream may be varied over a wide range, for example, between about 5° and about 95°; preferably between about 10° and about 90°; more preferably between about 15° and about 85°; even more preferably between about 20° and about 80°; more preferably still, between about 25° and about 75°; yet more preferably, between about 30° and about 70°, or between about 35° and about 65°, or between about 40° and about 60°; most preferably between about 45° and about 55°, in order to achieve a satisfactory vortex. In the embodiment shown, the angle of flow directors 605 is about 45°. In practice, the vortex formed in the second stream by flow directors 605 can extend for a considerable distance into the fluid supply outflow pipe (not shown) beyond outlet end 540.

This induced vortex produces a surprising increase in the venturi effect and reduces backpressure at any given fluid flow rate, and contributes to the unexpected and surprisingly wide operational range of the embodiment shown. The vortex also contributes to improved mixing of the first stream with the second stream as the first stream emerges from the outlet of venturi tube 600. Formation of an optimal vortex is dependent upon a number of factors, including the angle and cross sectional area of the flow directors and the increase in diameter of fluid flow outlet 520 over the diameter of fluid flow inlet 405.

In the embodiment shown in FIG. 12, flow directors 605 are a series of radial fins formed at an angle of about 45% to the direction of the second fluid stream as it emerges from apertures 435, and arranged in a circular pattern around the outlet of venturi tube 600. The size and shape of flow directors 605 may be varied. The cumulative cross sectional area of flow directors 605 may be smaller than, larger than, or equal to that of apertures 435. The choice of flow director size and shape, but particularly size, will affect the characteristics of the vortex induced in the second fluid stream as it emerges from apertures 435. Preferably, the cumulative cross sectional area of flow directors 605 will be no larger than that of apertures 435; even more preferably, the cumulative cross sectional area of flow directors 605 will be equal to or, most preferably, slightly less than that of apertures 435. Flow directors 605 may comprise circular angled holes. Alternatively, flow directors 605 may take the form of the radial fin shown in cutaway in FIG. 12 which extend all the way to the inner wall of conduit 500 and rest directly on shoulder 510, such that the outer wall of flow directors 605 is effectively formed by the inner wall of conduit 500 as opposed to being an integral part of venturi tube 600 as shown in FIG. 12.

In another aspect the invention is directed to an aspirator inlet having, at its point of intersection with the venturi tube, a diameter selected so as to achieve high flow velocities as the second fluid is introduced into the first fluid. Preferably, the inner diameter of the aspirator inlet will be selected so as to achieve subsonic, sonic or hypersonic flow velocities over at least a portion of the operating range of fluid flow rates for a given system.

Selection of the inner diameter of the aspirator inlet is varied depending upon the fluid flow rates for which a given system is designed, so as to achieve a desired second fluid introduction flow velocity over the operating range. The flow velocity at which the second fluid is introduced into the first fluid will affect the degree to which the second fluid (either the first or the second liquid may comprise a gas or a liquid) is incorporated into the first fluid, and can be varied, then, to achieve a desired degree of incorporation.

For example, where the first fluid is a liquid such as water and the second fluid is a gas such as ozone, selection of the aspirator inlet inner diameter, as well as other variables of the design of the apparatus as described herein, may be determined in order to maximize the incorporation of ozone into the water, thereby minimizing unincorporated ozone offgas. Similarly, where it is desired to introduce a solute into the first fluid, the choice of flow velocity, and thus of the inner diameter of the aspirator inlet, will vary depending upon the nature and properties of the solute. Thus, less soluble solutes may require higher flow velocities to be incorporated into a first fluid at a desired concentration.

In the preferred embodiment shown in FIGS. 10–12, venturi support body 400 comprises integral aspirator inlet 440. Because aspirator inlet 440 is an integral part of venturi support body 400, it does not come into contact with the first fluid stream. In the embodiment shown, aspirator inlet 440 is formed such that shoulder 433 is uninterrupted; it is also preferred to form aspirator inlet 440 completely through venturi support body 400, such that shoulder 433 is interrupted (not shown). Aspirator inlet 440 is sized to receive aspirator tube 445 by means of a threaded connection. Aspirator tube 445, which is replaceable, is fabricated from a material having sufficient tensile strength to withstand the forces exerted in operation upon aspirator tip 448 where it enters integral venturi 430; a preferred material having suitable characteristics for this purpose is stainless steel. It is preferred that aspirator tip 448 have a slight conical depression formed therein as shown, and that it be slightly below the surface of integral venturi 430 in operation. Where the second fluid is ozone gas, aspirator tube 445 is preferably constructed of 316 stainless steel. It will be appreciated that aspirator tube 445 of the embodiment shown may easily and economically be replaced if it should become worn, or in order to optimize the apparatus for a particular first fluid, second fluid or both.

The inner diameter of aspirator tube 445 may be varied as described herein. In the embodiment shown, the inner diameter of aspirator tube 445 is about 0.25" at the inlet end, and is reduced to about 0.046" at aspirator tip 448. The embodiment shown was designed to consistently draw between about 15 ft$^3$/hr and about 17 ft$^3$/hr at first fluid flow rates of 40 gal/min or greater. It has been shown to draw within these specifications at first fluid flow rates as great as 120 gal/min, giving it a surprisingly wide operational range of at least 80 gal/min. Based upon the results of testing performed so far, it is expected that this embodiment will continue to draw within specifications at first fluid flow rates in excess of 120 gal/min. Moreover, the embodiment shown has been demonstrated to draw near specifications at first fluid flow rates as low as 35 gal/min, and to continue to draw at first fluid flow rates as low as 18–20 gal/min. The embodiment shown has a fluid flow inlet 405 diameter of about 2.0", a fluid flow outlet 510 diameter of about 2.5", and an aperture 425 diameter of about 0.625".

The preferred embodiment shown in FIGS. 10–12 is particularly well suited for introducing a second fluid comprising ozone gas into a first fluid comprising water. Unexpected and surprisingly high incorporation of ozone into water has been observed in the operation of this embodiment. Further, while not wishing to be bound to a particular theory, it is believed that the flow velocities achieved at aspirator tip 448 in the operation of this embodiment effect a chemical change in the ozone as it is incorporated into the water, which may include the conversion of ozone to hydroxyl radicals. This embodiment is particularly useful for the purification of water by ozone.

The above embodiments can be used for fluids that can be used with a conventional venturi. As is known in the art, the fluids must be sufficiently viscous so as to be aspirated. For example, the invention can be used as an ozonator for introducing ozone into water. Preferably, the various parts of the above mentioned embodiments are formed by injection molding of a suitable thermoplastic which is chemically inert with respect to the fluids used. The above described embodiments are designed for installation within existing conduits. For facilitating such installation, the apparatus can be pre-installed in a section of conduit, with the said section of conduit subsequently inserted within an existing conduit.

It will be apparent that many other changes may be made to the illustrative embodiments, while falling within the scope of the invention and it is intended that all such changes be covered by the claims appended hereto.

The embodiments of the invention which an exclusive property or privilege is claimed are defined as follows:

1. Apparatus for use within a conduit for a fluid flow stream comprising
   a venturi tube having an inlet, an aspirator inlet and an outlet; and
   a disc positioned within said conduit in a sealable relationship therewith, said disc having a first aperture in communication with said venturi inlet and a plurality of second apertures which are not in communication with said venturi inlet, said second apertures arranged in a circular configuration around said first aperture, said disc has a concave face which divides the fluid flow stream into a first stream flowing through said first aperture and a second stream flowing through said second apertures; and
   means for supporting said venturi tube within said conduit in such a manner that said venturi tube is aligned axially in the direction of said flow stream.

2. Apparatus as claimed in claim 1 further comprising constriction means for reducing the pressure at the venturi tube outlet by constricting the flow of the fluid flow stream which flowed around said venturi tube through said second apertures in the vicinity of said venturi tube outlet.

3. Apparatus as claimed in claim 1 further comprising adjusting means for adjusting the flow rate of the second stream.

4. Apparatus as claimed in claim 3 further comprising first locking means for preventing rotation of the disc within the conduit and second locking means for preventing downstream movement of said disc within said conduit.

5. Apparatus for use within a conduit for a fluid flow stream comprising
   a venturi tube having an inlet, an aspirator inlet and an outlet;
   supporting means for supporting said venturi tube within said conduit in such a manner that said venturi tube is aligned axially in the direction of said fluid flow stream;
   fluid flow control means, comprising first passage means for allowing a first stream to flow and second passage means for allowing a second stream to flow for dividing said fluid flow stream into a first stream which flows through said venturi tube and a second stream which flows axially around said venturi tube; and
   vortex inducing means in said second passage means for inducing net axially symmetric vorticity in said fluid flow stream.

6. Apparatus as claimed in claim 5 wherein said vortex is induced at said outlet.

7. Apparatus as claimed in claim 5 wherein said vortex is induced near said outlet.

8. Apparatus as claimed in any of claims 5, 6 or 7 wherein said vortex inducing means comprises one or more flow directors.

9. Apparatus as claimed in claim 8, wherein said one or more flow directors is oriented at an angle to the direction of said fluid flow stream.

10. Apparatus as claimed in claim 9, wherein said angle of said one or more flow directors is between about 5° and about 95°.

11. Apparatus as claimed in claim 10, wherein said angle of said one or more flow directors is between about 10° and about 90°.

12. Apparatus as claimed in claim 11, wherein said angle of said one or more flow directors is between about 15° and about 85°.

13. Apparatus as claimed in claim 12, wherein said angle of said one or more flow directors is between about 20° and about 80°.

14. Apparatus as claimed in claim 13, wherein said angle of said one or more flow directors is between about 25° and about 75°.

15. Apparatus as claimed in claim 14, wherein said angle of said one or more flow directors is between about 30° and about 70°.

16. Apparatus as claimed in claim 15, wherein said angle of said one or more flow directors is between about 35° and about 65°.

17. Apparatus as claimed in claim 16, wherein said angle of said one or more flow directors is between about 40° and about 60°.

18. Apparatus as claimed in claim 17, wherein said angle of said one or more flow directors is between about 45° and about 55°.

19. Apparatus as claimed in claim 18, wherein said angle of said one or more flow directors is about 45°.

20. Apparatus as claimed in claim 8, wherein said one or more flow directors comprises a one or more radial fins.

21. Apparatus as claimed in claim 8, further comprising fluid flow control means for dividing the fluid flow stream into a first stream which flows through said venturi tube and a second stream which flows around said venturi tube.

22. Apparatus as claimed in claim 21 wherein said fluid flow control means comprises:
    first passage means through said venturi support means for allowing said first stream to flow; and
    second passage means through said venturi support means for allowing said second stream to flow.

23. Apparatus as claimed in claim 22, wherein said first passage means comprises at least one first aperture through said supporting means, and wherein said second passage means comprises at least one second aperture through said supporting means.

24. Apparatus as claimed in claim 23, wherein the cross sectional area of said one or more flow directors is equal to or less than the cross sectional area of said at least one second aperture.

25. Apparatus as claimed in claim 23, wherein the ratio of the cross sectional area of said at least one first aperture to the cross sectional area of said at least one second aperture is about 1:2.

26. Apparatus as claimed in claim 4, wherein the diameter of said conduit at said venturi tube outlet is greater than the diameter of said conduit at said venturi tube inlet.

27. Apparatus as claimed in claim 5, wherein the diameter of said conduit at said venturi tube outlet is between about 25% and about 75% greater than the diameter of said conduit at said venturi tube inlet.

28. Apparatus as claimed in claim 5, wherein the diameter of said conduit at said venturi tube outlet is between about 35% and about 65% greater than the diameter of said conduit at said venturi tube inlet.

29. Apparatus as claimed in claim 5, wherein the diameter of said conduit at said venturi tube outlet is about 50% greater than the diameter of said conduit at said venturi tube inlet.

30. Apparatus as claimed in claims 26, 27, 28 or 29, wherein the diameter of said conduit at said venturi tube outlet is greater than the diameter of said conduit at said venturi tube inlet for a distance no less than between about 1 and about 4 pipe diameters beyond said venturi tube outlet.

31. Apparatus as claimed in claim 30, wherein the diameter of said conduit at said venturi tube outlet is greater than the diameter of said conduit at said venturi tube inlet for a distance no less than between about 2 and about 3 pipe diameters beyond said venturi tube outlet.

32. Apparatus comprising a venturi support body having, at the fluid inflow end, a concave face which acts to direct an incoming fluid stream toward a central aperture and therethrough into a venturi tube which is partly integral to said venturi support body and partly a separate tube held in close apposition against a mating surface on said venturi support body, wherein said separate venturi tube further comprises one or more flow directors which cause the formation of a vortex in a portion of said fluid stream which is diverted through a series of apertures surrounding said central aperture as a function of increasing back pressure within said venturi tube, and wherein the diameter of the fluid flow outlet pipe is greater than the diameter of the fluid flow inlet pipe over a distance of not less than between about 2 and about 3 outlet pipe diameters beginning at the venturi tube outlet.

33. Apparatus comprising:
    a venturi support body comprising:
        a fluid flow inlet having a diameter approximately equal to the diameter of the fluid supply inflow pipe, said venturi support body being removably sealably connected to said fluid supply inflow pipe;
        a concave face which faces the fluid flow stream, having therein a central aperture, said central aperture having a diameter approximately 0.100" less than the inlet diameter of an integral venturi to which said central aperture leads; and having radial apertures which allow said fluid flow stream to pass through said venturi support body;

wherein said venturi is sealably removably connected to a conduit, said conduit having a diameter which is greater than the diameter of said fluid flow inlet;

wherein said venturi support body removable supports a venturi tube, said venturi tube comprising flow directors angled with respect to the direction of the portion of the fluid flow stream which flows through said radial apertures; and wherein said venturi support body further comprises adjusting means comprising a disk biased against said radial apertures by a helical spring, said helical spring also biasing said venturi tube against a shoulder on said conduit.

34. Apparatus for use within a conduit for a fluid flow stream comprising a venturi tube having an inlet, an aspirator inlet and an outlet;

supporting means for supporting said venturi tube within said conduit in such a manner that said venturi tube is aligned axially in the direction of said flow stream;

fluid flow control means for dividing the fluid flow stream into a first stream which flows through said venturi tube and a second stream which flows around said venturi tube;

wherein said supporting means comprises a plate positioned within said conduit in a sealable relationship therewith, said fluid flow control means including:

first passage means through said plate for allowing said first stream to flow; and second passage means through said plate for allowing said second stream to flow;

adjusting means for adjusting the flow rate of the second stream;

constriction means for reducing the pressure at the venturi tube outlet by constricting the flow of the second stream in the vicinity of said venturi tube outlet;

wherein said constriction means comprises a conically shaped flow diverter connected to said venturi tube outlet.

35. Apparatus for use within a conduit for a fluid flow stream comprising a venturi tube having an inlet, an aspirator inlet and an outlet;

supporting means for supporting said venturi tube within said conduit in such a manner that said venturi tube is aligned axially in the direction of said flow stream;

fluid flow control means for dividing the fluid flow stream into a first stream which flows through said venturi tube and a second stream which flows around said venturi tube;

wherein said supporting means comprises a plate positioned within said conduit in a sealable relationship therewith, said fluid flow control means including:

first passage means through said plate for allowing said first stream to flow; and second passage means through said plate for allowing said second stream to flow;

adjusting means for adjusting the flow rate of the second stream;

wherein said second passage means comprises at least one aperture through said plate and said adjusting means comprises:

a second plate, rotatable with respect to said first plate, said second plate having at least one aperture axially alignable with the at least one aperture of said first plate; and means for rotating said second plate in order to vary the extent to which the at least one aperture of said second plate is axially aligned with the at least one aperture of the first plate.

36. Apparatus as claimed in claim 35 wherein said adjusting means further comprises regulating means, responsive to changes in the fluid flow rate, for regulating the flow through the at least one aperture of said second plate, allowing the flow through said at least one aperture to increase as the flow rate of the fluid flow stream increases and decrease as the flow rate of the fluid flow stream decreases.

37. Apparatus as claimed in claim 36 wherein said regulating means comprises: blocking means for blocking the at least one aperture of said second plate; resilient means for biasing said blocking means towards the at least one aperture of said second plate.

38. Apparatus for use within a conduit for a fluid flow stream comprising a venturi tube having an inlet, an aspirator inlet and an outlet;

supporting means for supporting said venturi tube within said conduit in such a manner that said venturi tube is aligned axially in the direction of said flow stream;

fluid flow control means for dividing the fluid flow stream into a first stream which flows through said venturi tube and a second stream which flows around said venturi tube;

wherein said supporting means comprises a plate positioned within said conduit in a sealable relationship therewith, said fluid flow control means including:

first passage means through said plate for allowing said first stream to flow; and second passage means through said plate for allowing said second stream to flow;

adjusting means for adjusting the flow rate of the second stream, said adjusting means comprises regulating means, responsive to changes in the fluid flow rate, for regulating the flow through said second passage means, allowing the flow through said second passage means to increase as the flow rate of the fluid flow stream increases and decrease as the flow rate of the fluid flow stream decreases;

wherein said regulating means comprises: blocking means for blocking said second passage means;

resilient means for biasing said blocking means towards said second passage means;

wherein said supporting means further comprises a pipe extending axially downstream from said first plate, said venturi tube supported axially by said pipe, said pipe forming a channel from said first passage means to said venturi inlet; and wherein said blocking means comprises a blocking ring mounted on said pipe between said plate and said venturi tube for axial sliding movement on said pipe towards and away from said plate.

39. Apparatus as claimed in claim 37 wherein said supporting means further comprises a pipe extending axially downstream from said first plate, said venturi tube supported axially by said pipe, said pipe forming a channel from said first passage means to said venturi inlet; said second plate is journalled on said pipe; and wherein said blocking means comprises a blocking ring mounted on said pipe between said second plate and said venturi tube for axial sliding movement on said pipe towards and away from said second plate.

40. Apparatus for use within a conduit for a fluid flow stream comprising a venturi tube having an inlet, an aspirator inlet and an outlet;

supporting means for supporting said venturi tube within said conduit in such a manner that said venturi tube is aligned axially in the direction of said flow stream;

fluid flow control means for dividing the fluid flow stream into a first stream which flows through said venturi tube and a second stream which flows around said venturi tube;

wherein said supporting means comprises a plate positioned within said conduit in a sealable relationship therewith, said fluid flow control means including:
first passage means through said plate for allowing said first stream to flow; and
second passage means through said plate for allowing said second stream to flow;

adjusting means for adjusting the flow rate of the second stream, said adjusting means comprises regulating means, responsive to changes in the fluid flow rate, for regulating the flow through said second passage means, allowing the flow through said second passage means to increase as the flow rate of the fluid flow stream increases and decrease as the flow rate of the fluid flow stream decreases;

wherein said regulating means comprises: blocking means for blocking said second passage means;

resilient means for biasing said blocking means towards said second passage means;

wherein said second passage means comprises at least one aperture through said plate; said supporting means further comprises a pipe extending axially downstream from said first plate, said venturi tube supported axially by said pipe, said pipe forming a channel from said first passage means to said venturi inlet; and wherein said blocking means comprises a number of blockers equal to the number of apertures of said second passage means, each blocker sized and shaped to block one aperture, each said blocker supported by a spoke extending radially from a hub, said hub mounted on said pipe between said plate and said venturi tube for axial sliding movement on said pipe towards and away from said plate.

41. Apparatus as claimed in claim 37 wherein said supporting means further comprises a pipe extending axially downstream from said first plate, said venturi tube supported axially by said pipe, said pipe forming a channel from said first passage means to said venturi inlet; said second plate is journalled on said pipe; and wherein said blocking means comprises a number of blockers equal to the number of apertures of said second plate, each blocker sized and shaped to block one aperture, each said blocker supported by a spoke extending radially from a hub, and means for mounting said hub on said pipe in order to allow for axial movement of said hub but prevent rotation of said hub with respect to said second plate.

* * * * *

UNITED STATES PATENT AND TRADEMARK OFFICE
CERTIFICATE OF CORRECTION

PATENT NO : 5,676,173
DATED : October 14, 1997
INVENTOR(S): Conrad et al.

It is certified that error appears in the above-identified patent and that said Letters Patent is hereby corrected as shown below:

At column 4, line 13, "so" should be --to--;

At column 4, line 28, the first occurrence of "Disc" should be --disc--;

At column 7, line 15, "780" should be --70--;

At column 11, line 36, "first" should be --second--;

At column 15, line 3, after "venturi" insert --support body--; and

At column 15, line 6, "removable" should be --removably--.

Signed and Sealed this

Twenty-ninth Day of June, 1999

Attest:

Q. TODD DICKINSON

*Attesting Officer*  *Acting Commissioner of Patents and Trademarks*